(12) United States Patent
Hsiao et al.

(10) Patent No.: US 11,783,462 B2
(45) Date of Patent: Oct. 10, 2023

(54) METHOD AND APPARATUS FOR IMAGE PROCESSING

(71) Applicant: GUANGDONG OPPO MOBILE TELECOMMUNICATIONS CORP., LTD., Guangdong (CN)

(72) Inventors: Jenhao Hsiao, Palo Alto, CA (US); Chiuman Ho, Palo Alto, CA (US)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 135 days.

(21) Appl. No.: 17/153,439

(22) Filed: Jan. 20, 2021

(65) Prior Publication Data

US 2021/0142455 A1    May 13, 2021

Related U.S. Application Data

(63) Continuation of application No. PCT/CN2019/098701, filed on Jul. 31, 2019.
(Continued)

(51) Int. Cl.
*G06T 5/00* (2006.01)
*G06T 5/50* (2006.01)
(Continued)

(52) U.S. Cl.
CPC .............. *G06T 5/50* (2013.01); *G06N 3/02* (2013.01); *G06T 7/194* (2017.01); *G06T 11/00* (2013.01);
(Continued)

(58) Field of Classification Search
CPC ........ G06N 3/0454; G06N 3/08; G06N 3/084; G06N 3/0472; G06N 3/0481; G06N 3/04;
(Continued)

(56) References Cited

U.S. PATENT DOCUMENTS

2005/0047672 A1* 3/2005 Ben-Ezra ................ G06T 7/194
382/255
2005/0213845 A1* 9/2005 Avinash .................. G06T 5/002
382/173
(Continued)

FOREIGN PATENT DOCUMENTS

CN            102013107        4/2011
CN            102663766        9/2012
(Continued)

OTHER PUBLICATIONS

Gatys et al., "Controlling perceptual factors in neural style transfer," Arxiv.Org, Cornell university Library, 2016, 9 pages.
(Continued)

*Primary Examiner* — Quan M Hua
(74) *Attorney, Agent, or Firm* — Hodgson Russ LLP (57) ABSTRACT

A method and apparatus for image processing are provided. A mask is obtained by separating an original image into a background image and a foreground image. A partial stylized image is obtained by transforming the background image or the foreground image according to a selected style. A stylized image is obtained according to the mask and the partial stylized image.

9 Claims, 6 Drawing Sheets

Related U.S. Application Data (60) Provisional application No. 62/713,296, filed on Aug. 1, 2018.

(51) Int. Cl.
*G06T 7/194* (2017.01)
*G06N 3/02* (2006.01)
*G06T 11/00* (2006.01)

(52) U.S. Cl.
CPC ............ *G06T 2207/20081* (2013.01); *G06T 2207/20084* (2013.01)

(58) Field of Classification Search
CPC ........ G06N 3/0445; G06N 5/04; G06N 5/046; G06N 3/02; G06N 3/082; G06N 3/088; G06T 2207/20081; G06T 2207/20084; G06T 5/005; G06T 3/4053; G06T 2207/10016; G06T 3/4046; G06T 2207/30201; G06T 2207/10024; G06T 3/4076; G06T 5/002; G06T 7/0012; G06T 2207/10081; G06T 3/0012
See application file for complete search history.

(56) References Cited

U.S. PATENT DOCUMENTS

| | | | |
|---|---|---|---|
| 2006/0045357 A1* | 3/2006 | Schwartz | H04N 19/503 375/E7.263 |
| 2007/0086675 A1* | 4/2007 | Chinen | G06T 11/00 382/284 |
| 2007/0286520 A1* | 12/2007 | Zhang | H04N 7/147 382/173 |
| 2018/0075581 A1* | 3/2018 | Shi | G06N 3/084 |
| 2018/0300850 A1* | 10/2018 | Johnson | G06N 3/08 |

FOREIGN PATENT DOCUMENTS

| | | |
|---|---|---|
| CN | 102663766 A * | 9/2012 |
| CN | 106408595 | 2/2017 |
| CN | 106548208 | 3/2017 |

OTHER PUBLICATIONS

Bai et al., "Heterogeneous image stylization using neural networks," International Conference on Digital Image Computing: Techniques and Applications (DICTA), 2017, 7 pages.

Shen et al., "Automatic portrait segmentation for image stylization," Computer Graphics Forum: Journal of the European Association for Computer Graphics, 2016, vol. 35, No. 2, 10 pages.

He et al., "Deep residual learning for image recognition," retrieved from the internet: <https://arxiv.org/pdf/1512.03385.pdf>, 2015, 12 pages.

EPO, Extended European Search Report for EP Application No. 19845257.5, dated Jul. 21, 2021.

Gatys et al., "A neural algorithm of artistic style," arXiv:1508.06576v2, Sep. 2015, 16 pages.

Johnson et al., "Perceptual Losses for Real-Time Style Transfer and Super-Resolution: Supplementary Material," European Conference on Computer Vision, 2016, 6 pages.

He et al., "Mask R-CNN", arXiv:1703.06870v1, 2017, 9 pages.

WIPO, ISR for PCT/CN2019/098701, dated Oct. 30, 2019.

\* cited by examiner

METHOD AND APPARATUS FOR IMAGE PROCESSING

CROSS REFERENCE TO RELATED APPLICATION(S)

This application is a continuation of International Application No. PCT/CN2019/098701, filed on Jul. 31, 2019, which claims priority to U.S. provisional Application No. 62/713,296, filed on Aug. 1, 2018, the entire disclosures of which are incorporated herein by reference.

TECHNICAL FIELD

This disclosure relates to the field of image processing, and particularly relates to a method and apparatus for image processing.

BACKGROUND

The present ubiquity of digital cameras, mobile phone cameras, portable video recorders, as well as other devices with integrated cameras has resulted in a large and ever growing body of media objects, such as still images, videos and other forms of media. In order to improve the display effect of media or to obtain different styles or types of media, efforts to process media have come in the form of media enrichment such media conversion (also known as style transfer). In this way, more diversified media can be obtained.

SUMMARY

According to a first aspect of the disclosure, a method for image processing is provided. The method includes the follows. A mask is obtained by separating an original image into a background image and a foreground image. A partial stylized image is obtained by transforming the background image or the foreground image according to a selected style. A stylized image is obtained according to the mask and the partial stylized image.

According to a second aspect of the disclosure, a method for image processing is provided. The method includes the follows. A mask is obtained by separating an original image into a background image and a foreground image. An intermediate image is obtained by transforming the original image according to a selected style with an image transformation network, where the intermediate image comprises a stylized background image and a stylized foreground image. A stylized image is obtained by filling the mask with the stylized background image and the foreground image or by filling the mask with the stylized foreground image and the background image.

According to a third aspect of the disclosure, there is provided an apparatus for image processing. The apparatus includes at least one processor ant at least one non-transitory storage. When executed by the at least one processor, the instructions can cause the apparatus to carry out the operations of the method according to the foregoing first or second aspect.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Disclosed herein are implementations of image processing schemes which are capable of adaptively performing style transfer on media such as an image or video. Hereinafter, embodiments of the present disclosure will be described in detail with reference to the accompany drawings.

Figure 1:
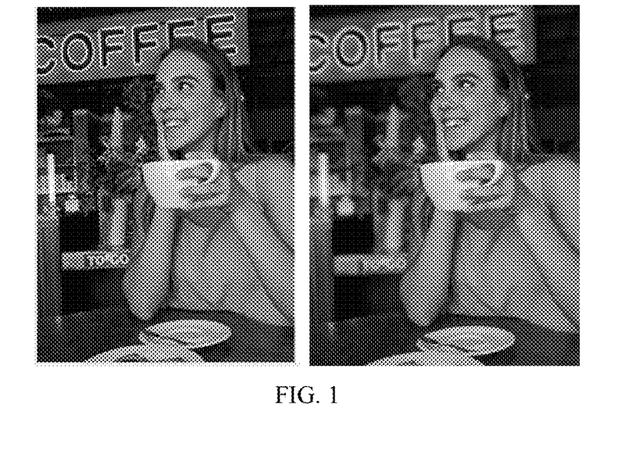
FIG. 1 illustrates example images relating to a traditional portrait mode.

Currently, there is a traditional portrait mode of making the subject look sharper relative to the background. For example, a single lens reflex (SLR) camera with a big lens has a shallow depth of field, meaning that objects at one distance from the camera are sharp while objects in front of or behind that "in-focus plan" are blurry. Photographers can manipulate focus, aperture, and distance from the lens to the object on a SLR to control depth of filed. Synthetic shallow depth of field images separates an image into two layers pixels that are part of the foreground (typically a person) and pixels that are part of the background. This separation, sometimes called semantic segmentation, allows the photographer or user to blur the background for example, however, it has no notion of depth and therefore, it cannot tell how much to blur the background. For example, a background blurred image is illustrated on the right side of FIG. 1 while an original image is illustrated on the left side of FIG. 1. As can be seen from FIG. 1, in this traditional portrait mode, the "blurry" operation does not offer too many choices to the user; it merely blurs background objects and can only draw limited attention from users.

Figure 2:
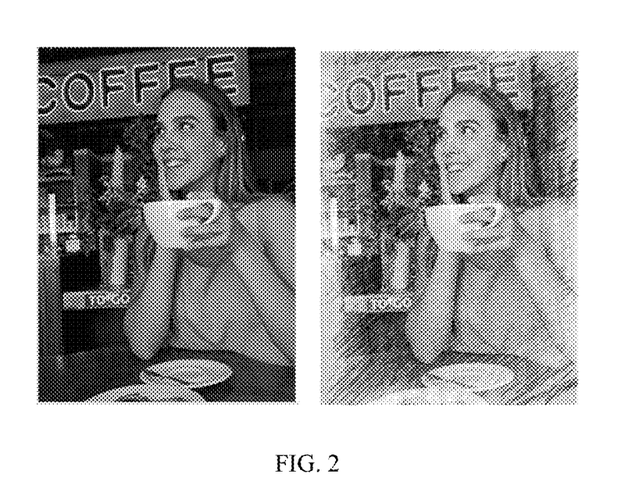
FIG. 2 illustrates example images relating to traditional style transfer.

In addition to the foregoing traditional portrait mode, some applications (hereinafter, "apps" for short) or tools associated with style transfer have also emerged. Style transfer can be defined as finding a pastiche image whose content is similar to that of a content image but whose style is similar to that of a style image. The focus of style transfer is how to render a content image in different styles. Examples of style transfer can be found in L. A. Gatys, A. S. Ecker, and M. Bethge, "A neural algorithm of artistic style," ArXiv e-prints, August 2015 and Justin Johnson, Alexandre Alahi, and Fei-Fei Li, "Perceptual Losses for Real-Time Style Transfer and Super-Resolution," ECCV 2016. One problem with current style transfer is that, style is transferred per image, which basically means that once you select a specific style for the image, the entire image will be transferred to the style selected. FIG. 2 illustrates an example of style transfer, in which the original image is illustrated on the left side, and the image subjected to style transfer is illustrated on the right side. As can be seen from FIG. 2, after style transfer, what is presented to the user is a completely stylized image. However, this is not flexible enough and sometimes, the completely stylized image is not what the user really wants.

In this disclosure, a novel image processing scheme is proposed to enrich the traditional portrait mode and the traditional style transfer. Unlike the traditional portrait mode that merely blurs background objects or the traditional style transfer that can only conduct style transfer on the entire image, the image processing scheme provided herein can create unique visual experiences through composing an interesting interplay between the background content or the foreground content and style (e.g., the style of a range of well-known artworks, such as abstract paintings).

For better understanding of the present disclosure, terms used herein are given below.

Figure 3:
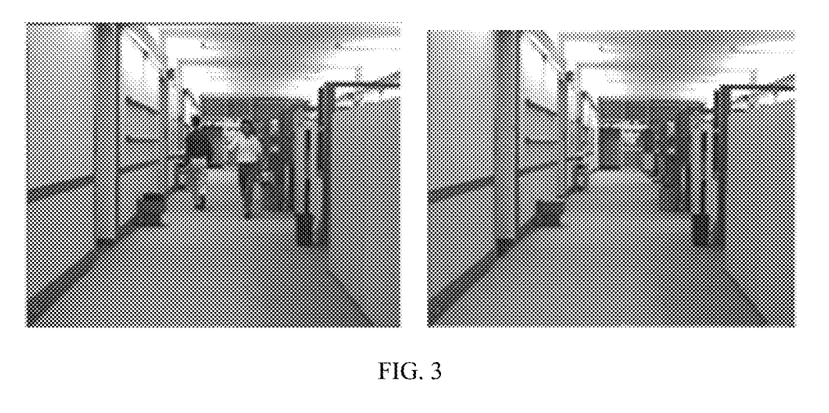
FIG. 3 illustrates an example of image segmentation.

Image segmentation: Image segmentation refers to a process of partitioning a digital image into multiple segments such as a background and a foreground. The result of image segmentation is a set of segments that collectively cover the entire image. FIG. 3 illustrates an example of image segmentation. In FIG. 3, the original image is illustrated on the left side while the background image is illustrated on the right side; in this case, the image (that is, the humans) other than the background image is the foreground image.

Region of interest (ROI): ROI are samples within data set identified for a particular purpose. Generally, an image's region of interest refers to objects (humans, cars, text and the like) in its foreground.

Mask: In computer science, a mask is data that is used for bitwise operations, particularly in a bit field. In the field of graphics, the binary mask defines a ROI of the original image. A mask can be created from an original image by classifying each pixel as belonging to either the region of interest or the background. For example, image areas in the foreground are given a pixel value with all bits set to 1 while the surrounding areas, for example, the background, are given a value with all bits set to 0. In the sample illustrated in FIG. 7, black pixels have the all-zero bits and white pixels have the all-one bits.

System Overview

Figure 4:
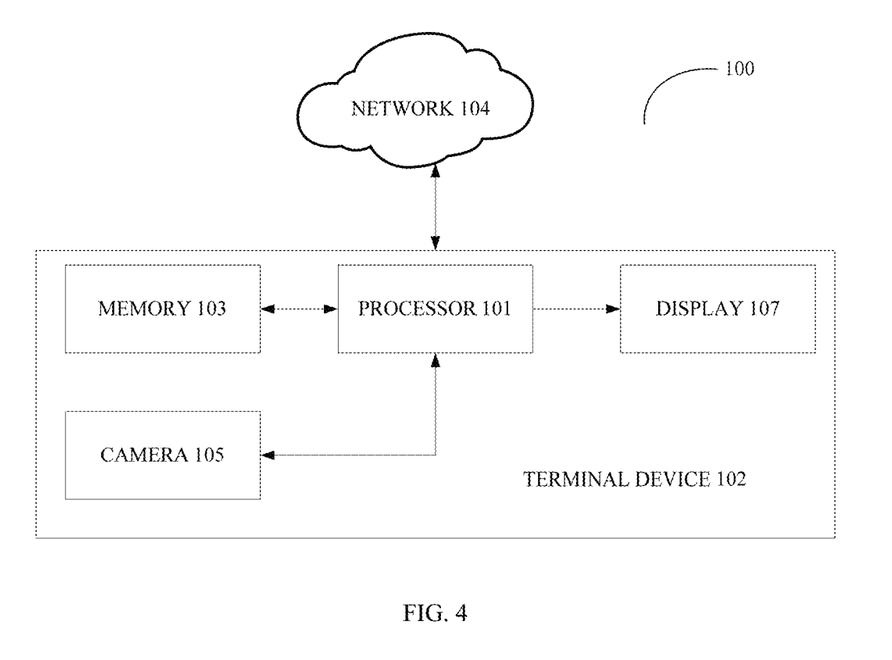
FIG. 4 illustrates an exemplary system for implementing the method for image processing of the disclosure.

FIG. 4 is a block diagram of an example system for embodying an image Styler or portrait Styler of the present disclosure. The image Styler is configured to achieve the image style transfer of the present disclosure detailed below. With the understanding that the principles of the disclosure apply more generally to any media such as image, picture, video and the like, the expression of "image styler", "image transfer", or "image transformation" shall not constitute any restriction on the technical solutions provided herein.

As illustrated in FIG. 4, the system 100 may be constructed to include a terminal device 102 and a network 104. The terminal device 102 can be various types of electronic devices, such as a mobile phone, a portable digital assistant (PDA), a camera, a video recorder, a video player, an audio player, a traditional computer, a mobile computer a portable computer device, a global positioning system (GPS), a combination thereof, and/or the like. In the following, while embodiments of the disclosure are performed or embodied in the context of the terminal device 102, embodiments may also be employed by a server, a service, or a combination thereof.

In one implementation, the terminal device 102 is capable of operating in accordance with a non-cellular communication mechanism. For example, the system is capable of communication in a wireless local area network (WLAN), other communication networks, and the like. Further, the system may communicate in accordance with techniques protocols such as radio frequency (RF), infrared (IrDA), or any other WLAN techniques. In FIG. 4, the above identified features are illustrated as the network 104.

The terminal device 102 includes a processor 101 or other processing component, a memory 103, and an imaging component such as a camera 105. The terminal device 102 may further include a user interface such as a graphical user interface (CUI). The user interface may be coupled to the processor 101. The user interface can be couple with a display 107. The display 107 can be a display screen such as a touch screen, liquid crystal display, and/or the like. The terminal device 102 may also have one or more input or output devices, such as a conventional earphone or speaker, a ringer, a microphone, a display, and/or the like.

Figure 6:
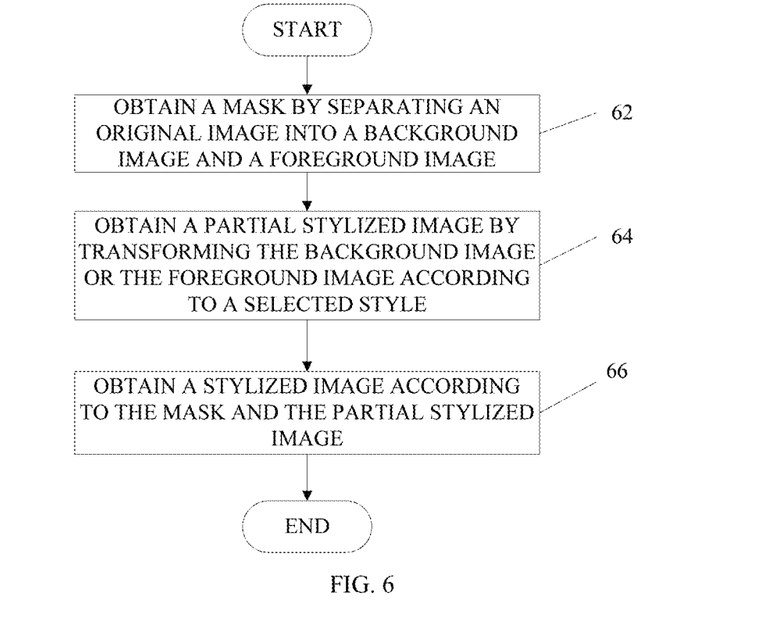
FIG. 6 is a flow chart illustrating the method for image processing.

The memory 103 can be a non-transitory computer readable storage medium, such as a random access memory (RAM), electrically erasable programmable read only memory (EEPROM), and the like. The memory 103 may comprise a cache area for temporary storage of data. The terminal device 102 may use the memory 103 to store media data such as images, pictures, videos, and the like. The memory 103 may also store one or more instructions and/or formulas for implementation of the method provided herein. For example, the stored instructions, when executed by the processor 101, cause the processor 101 to perform the method of FIG. 6 depicted below.

In one implementation, the processor 101 may provide at least one signal to and/or receive at least one signal from other components coupled therewith. In addition, the processor 101 may include circuitry for implementing audio feature, video feature, logic features, and/or the like. For example, the processor 101 may include digital signal processing device, a micro processor device, a digital-to-analog converter, an analog-to-digital converter, support circuits, and the like. As one implementation, the processor 101 can be a graphics processing unit (GPU). In addition to or as an alternative, the processor 101 may further include a neural processing unit (NPU). The NPU and the GPU can be set separately or can be integrated into one processor. The image Styler can be integrated into the GPU or NPU and communicates with camera-based or image-based applications stalled in the terminal device.

It should be noted that, FIG. 4 is provided by way of example and the system 100 and/or further system contemplated by this disclosure may include additional and/or fewer components, may combine components and/or divide one or more of the components into additional components, etc. For example, in terms of implementation of the disclosure, the terminal device 102 can be equipped with only one of the memory 103 and the camera 105. The terminal device 102 can read out media data from the memory 103. Alternatively, the terminal device 102 can capture image with the camera 105 in real time.

The image Styler of the disclosure can be represented in different ways and integrated into various applications installed in the terminal device. For example, the Portrait Styler can be easily integrated into products as an extended set of image filters, which can further improve the traditional semantic-unrelated image filters.

For example, the image Styler can be activated when the camera 105 is launched to stylize an image in real-time during capturing. Alternatively, the portrait Styler can be activated for style transfer of an image album, which is stored in the memory 103 for example, upon request of a user. Similarly, the image Styler can also be used for style transfer of videos; in this mode, it stylizes the background or the foreground of videos in a video album. In case that the terminal device 102 has access to the network 110, the image Styler can even obtain media from the network 110. Final styled image will be displayed on the display 107 for review by the user. The image subjected to the style transfer and finally displayed on the display 107 can be an image with the background transferred or an image with the foreground transferred. In the instance where the foreground is style transferred, the image styler can be referred to as an inverse image Styler, with which the foreground character is finally stylized to create for example a painting-like user portrait, such as the image illustrated in FIG. 11.

Image Styler

Figure 5:
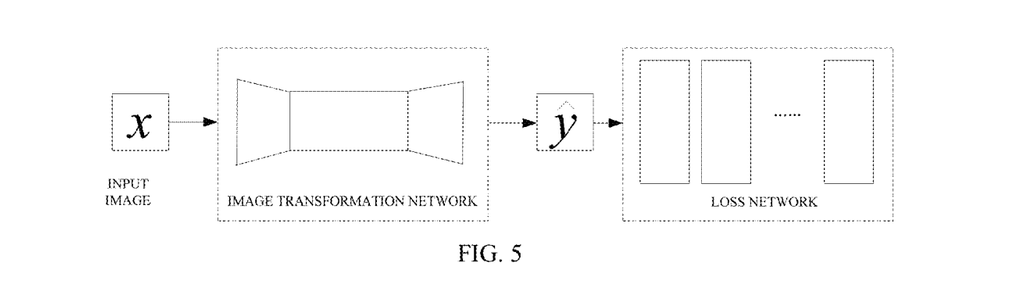
FIG. 5 illustrating an exemplary image Styler according to embodiments of the disclosure.

The image Styler provided herein can be embodied as a neural network(s). As illustrated in FIG. 5, the neural networks can include an image transformation network and a loss network, where an output end of the image transformation network is coupled with an input end of the loss network. The image transformation network is trained to transform input images into output images. The loss network pretrained from image classification is used to define perceptual loss functions that measure perceptual difference between images. The loss network remains fixed during the training process.

As one implementation, during a training stage, a feed forward image transformation neural network can be used as the image transformation network and is trained for image transformation tasks using stochastic gradient descent to minimize a loss functions to achieve the style transfer. However, as mentioned above, rather than using per-pixel loss functions depending only on low-level pixel information, the networks herein are trained using perceptual loss functions that depend on high-level features from a pretrained loss network. During training, perceptual losses measure image similarities more robustly than per-pixel losses, and at test-time the transformation networks run in real-time, which will be detailed below.

In one implementation, the loss network can be a visual geometry group (VGG) network having a plurality of convolutional layers. The image transformation network is a deep residual convolutional neural network parameterized by weights W. The image transformation network is configured to transform an input image(s) x into an output image(s) y via the mapping $y=f_W(x)$. Each loss function computes a scalar value $l(y, y_c)$ measuring the difference between the output image y and a target image $y_c$.

Rather than encouraging the pixels of the output image $y=fw(x)$ to exactly match the pixels of the target image $y_c$, instead encourage them to have similar feature representations as computed by the loss network φ. Let $φ_j(x)$ be the activations of the $j^{th}$ convolutional layer of the VGG network, where $φ_j(x)$ will be a feature map of shape $C_j \times H_j \times W_j$. The feature reconstruction loss is the (squared, normalized) Euclidean distance between feature representations:

$$\ell_{feat}^{\phi,j}(\hat{y}, y) = \frac{1}{C_j H_j W_j} \|\phi_j(\hat{y}) - \phi_j(y)\|_2^2$$

Where j represents the $j^{th}$ convolutional layer; $C_j$ represents the number of channels input into the $j^{th}$ convolutional layer; $H_j$ represents the height of the $j^{th}$ convolutional layer; $W_j$ represents the width of the $j^{th}$ convolutional layer; $φ_j(x)$ represents a feature map of shape $C_j \times H_j \times W_j$.

$$\hat{y} = \underset{y}{\operatorname{argmin}} \lambda_c \ell_{feat}^{\phi,j}(y, y_c)$$

Where y represents an output image of the image transformation network; $y_c$ represents a target image of the image transformation network; $l(y, y_c)$ represents a scalar value measuring the difference between the output image y and the target image $y_c$.

In one implementation, the Image Styler implemented as a CNN is trained as follows.

An original image is input into the CNN as an input. The original image is then separated into a background image and a foreground image to obtain a mask. The separation can be done at a first layer of the CNN before the image transformation network of FIG. 5. Then a partial stylized image is obtained by transforming the background image or the foreground image according to a selected style at the image transforming network of the CNN. Next, a stylized image according to the mask and the partial stylized image at the image transforming network to output.

The output partial stylized image is compared with a target image, a scalar value measuring the difference between the output image and the target image is calculated. If the scale value $l(y, y_c)$ satisfies a preset threshold value, such as less than or equal to the preset threshold value, the CNN can be deemed as well trained.

During testing stage, the image transformation network can help transform the input image to become a stylized image via the trained feed forward neural network.

Method Overview

In order to obtain a stylized image via the method for image processing provided herein, image segmentation, style transfer, and stylized image generating will be conducted sequentially. FIG. 6 is a flow chart illustrating the method, which is performed in a CNN and begins at block 62.

At block 62, a mask is obtained by separating an original image into a background image and a foreground image. The mask here can be obtained at a neural network without interaction with the user. The original image can be a color image or a gray image, the present disclosure is not particularly limited. The image separation can be implemented via background or foreground extraction. To achieve this, a neural network (see Kaiming He Georgia Gkioxari Piotr Dollar Ross Girshick, "Mask R-CNN", ICCV 2017 for example) is trained to predict a binary mask for each ROI. To obtain the binary mask, ROI (that is, the foreground image) and other pixel points (that is, the background image) can be determined as well. Then the content of the foreground and the foreground can be extracted respectively based on the ROI determined.

Figure 7:
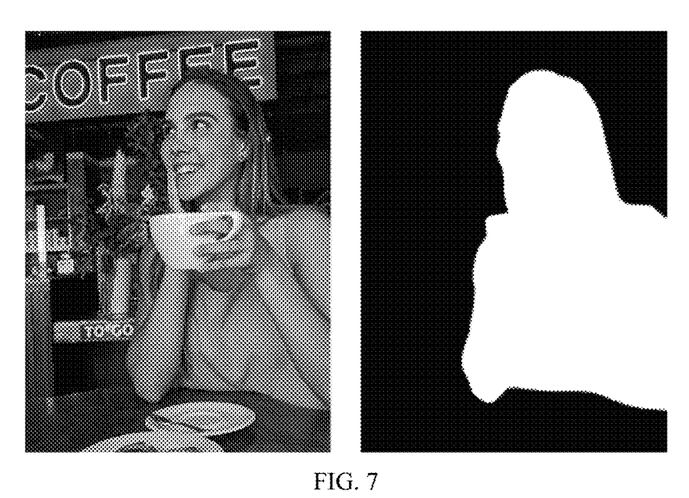
FIG. 7 is a schematic diagram illustrating a mask used in the method for image processing.

The resulted mask as shown in FIG. 7 will be used later to fuse a partial stylized image and partial original image, or to fuse an intermediate stylized image and partial original image.

At block 64, a partial stylized image is obtained by transforming the background image or the foreground image according to a selected style.

For example, the transforming can be conducted at the foregoing image Styler illustrated in FIG. 5. Specifically, the background image or the foreground image can be input to the image Styler, particularly, the image transformation network of the image Styler. As can be seen, here, the input of the image transformation network is the background image or the foreground image rather than the whole image. Then the image Styler will transform the background image or the foreground image input thereto according to the selected style, to obtain the partial stylized image. It should be noted that the partial stylized image can be a partial stylized background image and the partial stylized foreground image. The style can be selected by user or can be selected or set by the system of the terminal device by default by taking user habit or user preference into consideration according to usage history of the user. In terms of whether the background image or the foreground image will be input to the image transformation network, it can be determined or selected by the user, or can be set by the system. For example, the system can be set to prioritize the background image for transformation unless a different instruction is received from the user. In this manner, since only certain part of the image rather than the entire image is sent to be transformed, the transforming speed can be improved.

At block 66, a stylized image (that is, a finally stylized image relative to the partial stylized image) is obtained according to the mask and the partial stylized image.

In some configurations, the stylized image can be obtained by filling the mask with the partial stylized image and at least one of the background image and the foreground image that does not subjected to the transforming. Specifically, when the background image is input to the image transformation network and accordingly a partial stylized background image is obtained, the mask can be filled at the background part with the partial stylized background image and at the foreground part with the original foreground image (that is, content of foreground of the original image) obtained at block 64. On the other hand, when the foreground image is input to the image transformation network and accordingly a partial stylized foreground image is obtained, the mask can be filled with the partial stylized foreground image and original background image obtained at block 64.

Still another example, when the partial stylized background image is obtained, the mask can be filled with both the original background image and the original foreground image and then stack the partial stylized background image on the original background image for example. The same applies when partial stylized foreground image is obtained and will not be repeated here.

Figure 8:
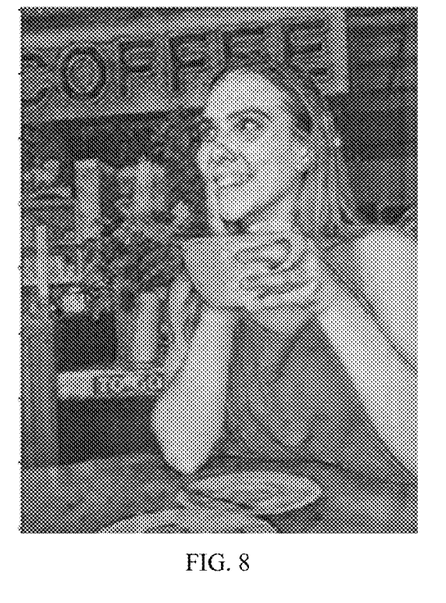
FIG. 8 is a schematic diagram illustrating an intermediate stylized image obtained during the method for image processing.

In the above, we have discussed the situation where only certain part of the original image is input to the image transformation network, however, it should be noted that the above solution is only one option for the disclosure, there are still other implementation choices. For example, the entire image can be input to the image transformation network, after transformation, an intermediate stylized image will be obtained, for example, the one illustrated in FIG. 8.

After the intermediate image is obtained, similar as the method illustrated in FIG. 6, the mask can be utilized to obtain the finally stylized image for display to the user. For example, if the user actually want to conduct image processing on the background contents, the stylized background image can be extracted from the intermediate image according to the ROI for example, then the mask can be filled with the stylized background image and the original foreground image; alternatively, the mask can be filled with the entire intermediate image and then stack the original foreground image (for example, content of the foreground of the original image, that is, the person) on the intermediate image correspondingly along the boundaries defined by the ROI.

After such filling, the stylized image obtained can be further subjected to a post-processing like smoothing or blending, which helps to deliver better result.

Figure 9:
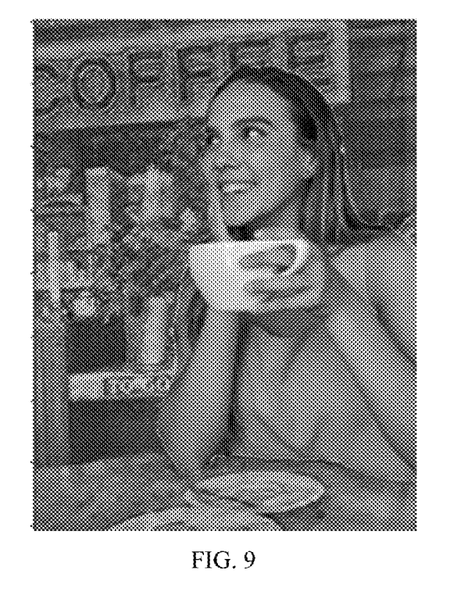
FIG. 9 illustrates a stylized image obtained during the method for image processing and presented to the user.
Figure 10:
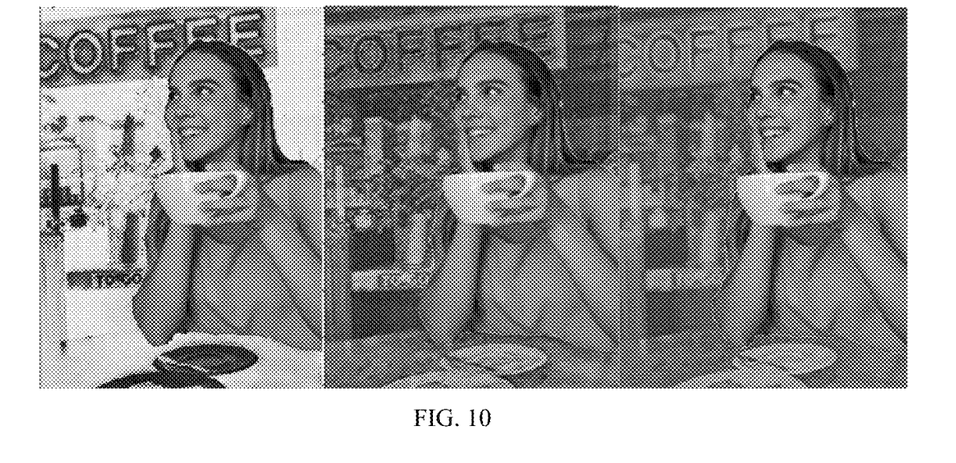
FIG. 10 illustrates other exemplary stylized images obtained during the method for image processing and presented to the user.
Figure 11:
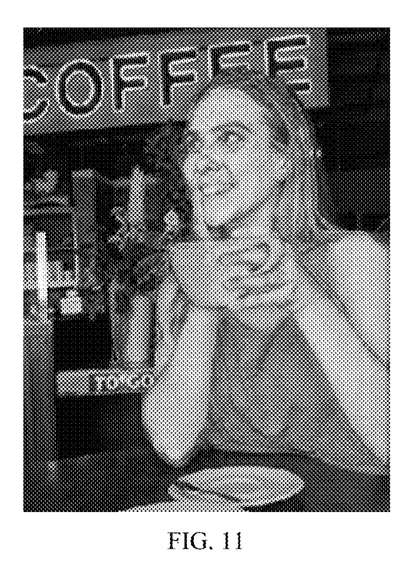
FIG. 11 illustrates an inverse stylized image.

The stylized image presented to the user is illustrated in FIG. 9. Further, FIG. 10 illustrates some examples in which the images displayed have different stylized background. As can be seen, the stylized image displayed abstracts the background and create more impressive visual effects to user. FIG. 11 illustrates an example when user actually wants to conduct image processing on the foreground contents, in this mode, it reversely stylizes the foreground user to create a painting-like user portrait.

Implementations of the present disclosure further provide an apparatus for image processing. The apparatus can be the terminal device illustrated in FIG. 4 for example. The apparatus may include at least one processor and at least one non-transitory computer readable storage coupled with the at least one processor. The non-transitory storage is configured to store instructions which, when executed by the at least one processor, are operable with the processor to carry out operations described in the method implementations. Examples of the non-transitory storage include but not limited to read only memory (ROM), random access memory (RAM), disk, CD, and the like.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for image processing, comprising:
   obtaining a mask by separating an original image into a background image and a foreground image;
   obtaining a partial stylized image by transforming, the foreground image according to a selected style without transforming the background image; and
   obtaining, a stylized image according to the mask and the partial stylized images;
   wherein obtaining the partial stylized image by transforming, the foreground image according to the selected style without transforming the background image comprises transforming the foreground image according to the selected style with an image transformation network to obtain the partial stylized image;
   wherein prior to obtaining the mask, the image transformation network is trained with perceptual loss functions defined by a loss network;
   wherein the loss network is a visual geometry group (VGG) network having a plurality of convolutional layers;
   wherein training the image transformation network with perceptual loss functions defined by the loss network comprises:
      using values of the perceptual loss functions as activations of one of the plurality convolutional layers of the loss network according to the following formula:

$$\ell_{feat}^{\phi,j}(\hat{y}, y) = \frac{1}{C_j H_j W_j} \|\phi_j(\hat{y}) - \phi_j(y)\|_2^2$$

wherein:
j represents a $j^{th}$ convolutional layer;
$C_j$ represents a number of channels input into the $j^{th}$ convolutional layer;
$H_j$ represents a height of the $j^{th}$ convolutional layer;
$W_j$ represents a width of the $j^{th}$ convolutional layer; and
$\phi_j(x)$ represents a feature map of shape $C_j \times H_j \times W_j$.

2. The method of claim 1, wherein obtaining the stylized image according to the mask and the partial stylized image comprises:
obtaining the stylized image by filling the mask with the partial stylized image and the background image.

3. The method of claim 1, wherein:

$$\hat{y} = \underset{y}{\operatorname{argmin}} \lambda_c \ell_{feat}^{\phi,j}(y, y_c)$$

y represents an output image of the image transformation network;
$y_c$ represents a target image of the image transformation network; and
$l(y, y_c)$ represents a scalar value measuring a difference between the output image y and the target image $y_c$.

4. The method of claim 1, wherein the image transformation network is a deep residual convolutional neural network.

5. A method for image processing, comprising:
obtaining a mask by separating an original image into a background image and a foreground image;
obtaining, with an image transformation network, an intermediate image by transforming the original image according to a selected style, wherein the intermediate image comprise a stylized background image and a stylized foreground image; and
obtaining a stylized image by filling the mask with the stylized background image and the foreground image or by filling the mask with the stylized foreground image and the background image;
wherein the image transformation network is a deep residual convolutional neural network trained with perceptual loss functions defined by a loss network having a plurality of convolutional layers;
wherein the image transformation network is trained to output an image with pixels similar to that of a target image of the image transformation network;
wherein similar feature representations between pixels are computed with the loss network;
wherein prior to obtaining the mask, the image transformation network is trained by using an output of the loss network as activations of one of the plurality of convolutional layers of the loss network according to the following formula:

$$\ell_{feat}^{\phi,j}(\hat{y}, y) = \frac{1}{C_j H_j W_j} \|\phi_j(\hat{y}) - \phi_j(y)\|_2^2$$

wherein:
$\phi$ represents the perceptual loss functions;
j represents a $j^{th}$ convolutional layer;
$C_j$ represents a number of channels input into the $j^{th}$ convolutional layer;
$H_j$ represents a height of the $j^{th}$ convolutional layer;
$W_j$ represents a width of the $j^{th}$ convolutional layer; and
$\phi_j(x)$ represents a feature map of shape $C_j \times H_j \times W_j$.

6. The method of claim 5, wherein:

$$\hat{y} = \underset{y}{\operatorname{argmin}} \lambda_c \ell_{feat}^{\phi,j}(y, y_c)$$

y is an output image of the image transformation network;
$y_c$ is a target image of the image transformation network; and
$l(y, y_c)$ represents a scalar value measuring a difference between the output image y and the target image $y_c$.

7. An apparatus for image processing, comprising:
at least one processor; and
at least one non-transitory computer readable storage storing instructions which, when executed by the at least one processor, are operable with the at least one processor to:
obtain a mask by separating an image into a background image and a foreground image;
obtain, with an image transformation network, a partial stylized image by transforming the foreground image according to a selected style without transforming the background image; and
obtain, a stylized image according to the mask and the partial stylized image;
wherein the image transformation network has an output end coupled with a loss network and is configured to be trained with perceptual loss functions defined by the loss network;
wherein the loss network is a VGG network which is fixed during training of the image transformation network and having a plurality of convolutional layers;
wherein the image transformation network is configured to be trained by using values of the perceptual loss functions as activations of one of the plurality of convolutional layers of the loss network according to the following formula:

$$\ell_{feat}^{\phi,j}(\hat{y}, y) = \frac{1}{C_j H_j W_j} \|\phi_j(\hat{y}) - \phi_j(y)\|_2^2$$

wherein:
$\phi$ represents the perceptual loss functions;
j represents a $j^{th}$ convolutional layer;
$C_j$ represents a number of channels input into the $j^{th}$ convolutional layer;
$H_j$ represents a height of the $j^{th}$ convolutional layer;
$W_j$ represents a width of the $j^{th}$ convolutional layer; and
$\phi_j(x)$ represents a feature map of shape $C_j \times H_j \times W_j$.

8. The apparatus of claim 7, wherein the image transformation network is configured to transform an input image x into an output image y via a mapping of y=fw (x).

9. The apparatus of claim 7, wherein:

$$\hat{y} = \underset{y}{\operatorname{argmin}} \lambda_c \ell_{feat}^{\phi,j}(y, y_c)$$

y represents an output image of the image transformation network;

$y_c$ represents a target image of the image transformation network; and $\ell(y, y_c)$ represents a scalar value measuring a difference between the output image y and the target image $y_c$.

* * * * *